March 29, 1966  H. J. TAYLOR ETAL  3,243,132
EXTENSIBLE RETRACTABLE STEM DEVICE
Filed April 1, 1963  2 Sheets-Sheet 1

Inventors
HENRY JAMES TAYLOR
JOHN ARTHUR FRY
by: Cavanagh & Norman

United States Patent Office 3,243,132
Patented Mar. 29, 1966

3,243,132
EXTENSIBLE RETRACTABLE STEM DEVICE
Henry James Taylor, Don Mills, Ontario, and John Arthur Fry, Willowdale, Ontario, Canada, assignors to The De Havilland Aircraft of Canada, Limited
Filed Apr. 1, 1963, Ser. No. 269,258
10 Claims. (Cl. 242—54)

This invention relates to an extensible retractable stem device in particular of a form adaptable for use as a projectable aerial structure for satellites and space craft.

Prior extensible structures developed from a thin strip of metal have been known in the art of coilable retractable metal tape rules and automobile aerial structures. The ratio of a fully extended length to a mean diameter of such structures is of the order of less than 200 to 1. In satellite aerial structures a much greater length of projectable antenna members may be required. It has been found that in the motorized projection of the spring strip material adapted to curl into a tube when free of the spool upon which it is coiled the force required for projection and retraction of lengths of the order of 1000 to 30,000 diameters are so great as to cause buckling and/or breaking in jamming upon the take-off spool upon which the spring is coiled. Thus prior art structures may be regarded as impractical and in the main unworkable or inoperative for projection of long boom like stem structures contemplated by this invention as contrasted with the very short stem devices of the prior art.

It is therefore the main object of the present invention to provide a stem device and extending and retracting mechanism therefor in combination therewith adapted to provide useable stem structures in which the coilable stem forming strip is supported against axial and buckling loads during coiling and uncoiling from the storage drum whereby stem structures of a length greater than 200 diameters may be projected and retracted with operative reliability.

Other objects of the invention will be appreciated by the study of the following specification taken in conjunction with the following drawings.

Figure 1:
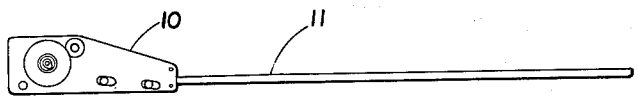
FIGURE 1 is a pictorial view of a stem device according to the invention showing the stem structure partially extended.

Referring to the drawings a stem device of the invention as shown in FIGURE 1 wherein a reeling and unreeling mechanism in casing 10 is adapted to project and retract the stem structure 11 formed of the spring strip material adapted to curve upon itself to form a tube. When the stem structure is extended to be projected two lengths beyond 100 diameters the coil axial compression placed thereon during the projecting operation at the point of reel up of the strip in the spool (not shown) within the structure 10 may result in buckling or breaking of the strip.

Figure 2:
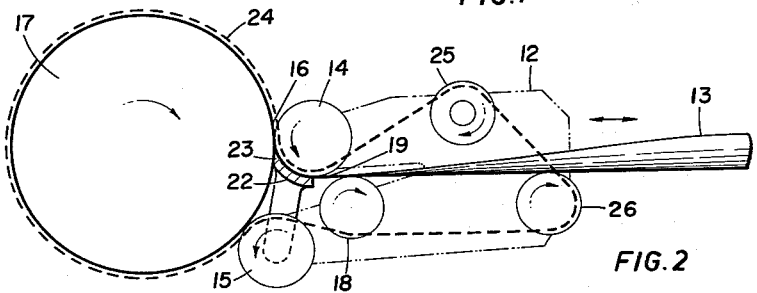
FIGURE 2 is a diagrammatic section of a movable carriage guide structure adapted to ride against the stem strip reeled on a storage drum or spool and located to direct the strip radially therefrom.
Figure 2A:
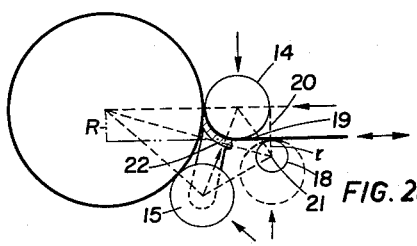
FIGURE 2A is a diagram of roller geometry of FIGURE 2.

It is necessary according to this invention, not only to support the strip with a minimum of friction as it develops its tubular form upon unreeling from the storage reel or spool but also to support the stem against axial thrust. Thus in FIGURE 2 the invention contemplates a movable carriage at 12 movable in the axial direction of the strip 13 to present reel engaging rollers 14 and 15 thereon to the reeled strip surface 16 on the reel 17, the latter being sometimes referred to herein as a drum or spool. The stem directing anti-buckling roller 18 is positioned relative to the take-off roller 14 as to position a common tangent 19 spaced a distance "$r$" equal to the radius of roller 14, a tangent 20 from roller 14 to the axis 21 of roller 18 being substantially at right angles to the tangent 19 (FIGURE 2A). A shoe or doctor member 22 having a concave support face 23 is spaced from roller 14 between reel 17 and roller 18 a distance to accommodate freely the strip 16 but so positioned as to support the strip against buckling due to axial compressive forces therein.

Figure 3:
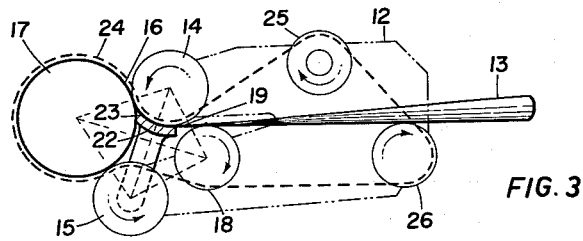
FIGURE 3 is a developed view of the structure of FIGURE 2 showing the manner in which said movable structure maintains support as the effective diameter of the reeled strip on the drum is reduced during extension of the stem strip.
Figure 5:
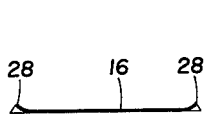
FIGURE 5 is a sectional veiw on the line 5—5 of FIGURE 4.
Figure 6:
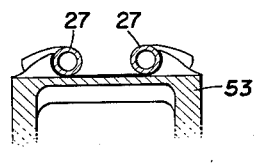
FIGURE 6 is a sectional view on the line 6—6 of FIGURE 4.
Figure 7:
FIGURE 7 is a sectional view on the line 7—7 of FIGURE 4.
Figure 4:
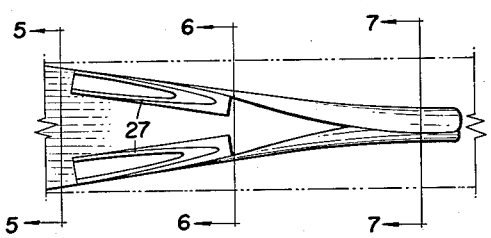
FIGURE 4 is a plan view of the forming guide structure only of the movable support structure of FIGURE 2 and showing the developing form of the stem strip in association therewith.

Rollers 14 and 15 of carriage 12 are maintained in engagement with the strip on drum 17 by spring means such as the endless spring belt 24 which extends around the strip on drum 17 to maintain the strip from uncoiling thereon drives roller 14 and extends about idler roller 25 and support roller 26 to anti-buckling roller 18 thence over retaining roller 15 thus as the roll of coil strip reduces in diameter as is revealed in FIGURE 3 the carriage is moved by the spring tension of the spring belt loop to maintain engagement of the rollers 14 and 15 therewith. In addition, however, it is necessary to support the strip as it is released beyond the anti-buckling roller 18 until the strip forms the final tubular structure in the extended state. Thus in FIGURE 4 a plan view of the strip from the thrust roller outwardly is shown wherein converging cylindrical guide means 27 are located immediately above the strip in the area between the support roller 26 and the anti-buckling roller 18 to permit free but guided passage of the strip between such rollers and the cylindrical shaping members 27. A resulting condition imposed on the form of the strip as it projects is revealed in FIGURES 5, 6 and 7. In FIGURE 5 being a section of 5—5 of FIGURE 4 it will be observed that as soon as this strip is free of roller 14 that the side edges 28 begin to curl up and inwardly under inherent spring tension in the strip itself at section 6—6 the strip is supported on its underside by roller 26 and on its upper side by the converging cylindrical members or form guides 27 so that the curling inward of the portions 28 is restrained shortly beyond the sections 6—6 and at substantially the section 7—7 the material of the strip is coiled upon itself by virtue of its inherent tension to define the free self-supporting tubular structure 29 shown in FIGURE 7.

Figure 8:
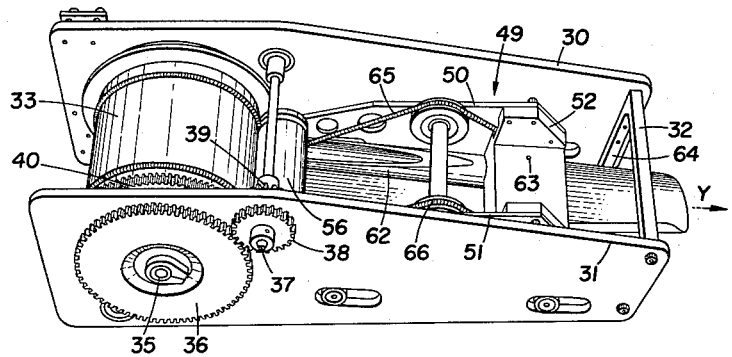
FIGURE 8 is a perspective view looking down on a practical form of extensible retractible stem device according to the invention of a kind particularly adapted to satellite use.
Figure 9:
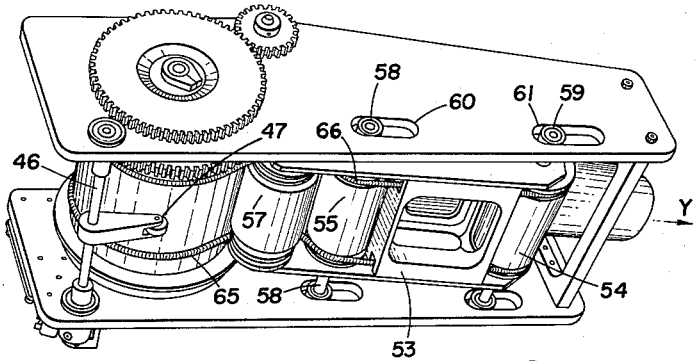
FIGURE 9 is the underside of a perspective view of the device of FIGURE 8.
Figure 10:
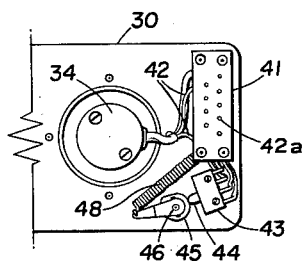
FIGURE 10 is a side elevation of the left-hand hidden side of the structure of FIGURE 8 revealing the motor drive and control switch thereon.

One suitable mechanical structure according to the invention is revealed in FIGURES 8, 9 and 10 wherein side plate members 30 and 31 spaced by cross frame 32 and a fixed hollow shaft (not shown) within the strip reel 33 carries a stationary shaft motor 34 having a driving shaft 35, driving gear 36 effecting driving through pinion shaft of gearing 37, 38 and 39 to gear 40 effecting rotation of the strip reel. On the other side plate 30 is a terminal strip 41 carrying the motor connecting leads 42 and terminals 42a, a limit switch 43 having an actuating member 44 engaged by cam 45 on shaft 46. Shaft 46 carries a strip or spool engaging member 47 and which, under tension of spring 48, is maintained in continuous engagement with the surface of the strip coil. Thus after a predetermined uncoiling of strip from the drum or reel the motor circuit controlled by switch 43 may be electrically severed. The carriage 12 described in FIGURES 2 and 3 is revealed in the carriage structure of FIGURES 8 and 9 by the numeral 49 having side frame pieces 50 and 51 spaced by spacer member 52 and a platform or support frame 53, the latter being located between the support rollers 54 and 55 corresponding respectively to rollers 26 and 18 of FIGURE 2 associated with rollers 56 and 57 and a shoe or doctor member not shown corresponding to rollers 14 and 15 and shoe 22 of FIGURES 2 and 3. The carriage structure 49 is slidably supported between the frame members 30 and 31 by bearing rollers 58 and 59 on the shafts of rollers 55 and 54 respectively and ride within guide slots 60 and 61 aligned in a direction parallel to the projecting axis "Y" of the coiled strip.

As will be seen in FIGURE 8 the cylindrical converging guide members may be provided in the form of convergent positioned tubular members 62 fastened to the rod spacer members such as by a pivot fastening 63 and over-lying rollers 55 and 54 and the support frame 53 thus to provide full geometric support of this strip in its passage from the drum beyond the open frame member 32 through the mouth opening 64 thereof. In the form of structures shown in FIGURES 8 to 10 the retaining tension spring is in the form of two similar endless belts 65 and 66 formed of spring wire to uniform coiled diameter whereby the spring tension thereof extending about the coil spring itself on the drum and the effecting and supporting structure therefor effectively translate such spring tension into an array of multidirectional forces supporting the strip in all stages of its shape development substantially to the final tube form and especially at the initial critical stages of projection from the strip coil itself. While the shown device of FIGURES 2 and 3 is not evident in FIGURES 8 and 9 it will be assumed to be present in circumstance where heavy axial loads on the strip may arise.

Figure 11:
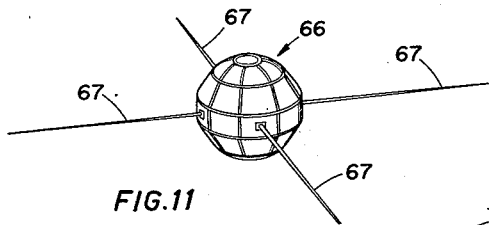
FIGURE 11 is a suggestive pictorial view of a satellite structure embodying the stem device of the invention the same serving as aerials of the length of the order of one mile.

In the satellite structure 66 suggestively illustrated in FIGURE 11 a plurality of antennae 67 is shown projecting therefrom the same being defined by a stem device of the form described herein disclosed.

By virtue of the critical support given the strip during its shaping formation into an essentially structural rigid tube in its tubular form aerial structures may be projected from a vehicle in space for a distance of many thousands of feet. Whereas it is the tendency in the prior art to consider mainly the force of gravity in the projection of stem devices such concepts of the force involved are entirely misleading as to the true nature of the force involved in a space structure where no support is available by taking advantage of force of gravity or force arising from the force of gravity.

It will be apparent from the foregoing that the invention concerns an extensible retractable stem device comprising a strip inherently tensioned when free to curl transversely to form a tube; a spool device upon which said strip may be reeled in flat uncurled form and a frame rotatably supporting said spool device. Drive means on said frame connect to said spool device for reeling and unreeling said strip by rotation of said spool. A carriage is mounted on said frame and slidable for motion in a direction substantially radially toward and away from said spool. A strip engaging roller on said carriage engages with the strip on said spool to retain said strip thereon. A doctor member on said carriage is spaced from said roller to accommodate therebetween strip from said spool and to support said strip against compressive axial forces in said strip. A strip directnig anti-buckling roller on said carriage is spaced from said reel engaging roller to accommodate said strip therebetween and located relative to said engaging roller to direct said strip substantially radially from said spool. Means urge said carriage toward said spool for pressure engagement of said engaging roller with said reeled strip while said spool is stationary and during reeling and unreeling of said strip.

It is intended that the present disclosure should not be construed in any limiting sense other than that indicated by the scope of the terminology herein and the following claims.

What we claim is:

1. An extensible retractable stem device comprising: a strip inherently tensioned when free to curl transversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a shoe member on said carriage spaced from said roller to accommodate therebetween strip from said spool and to support said strip against compressive axial forces in said strip; a strip directing anti-bucklnig roller on said carriage spaced from said strip engaging roller to accommodate said strip therebetween and located relative to said strip engaging roller to direct said strip substantially radially from said spool; and means urging said carriage toward said spool for pressure engagement of said strip engaging roller with said reeled strip while said spool is stationary and during reeling and unreeling of said strip.

2. An extensible retractable stem device comprising: a strip inherently tensioned when free to curl transversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a shoe member on said carriage spaced from said roller to accommodate therebetween strip from said spool and to support said strip against compressive axial forces in said strip; a strip directing anti-buckling roller on said carriage spaced from said strip engaging roller to accommodate said strip therebetween and located relative to said strip engaging roller to direct said strip substantially radially from said spool; and at least one expansible spring loop tensioned about said reeled strip and said rollers to retain said strip on said spool and urge said carriage towards said spool for pressure engagement of said strip engaging roller with said reeled strip.

3. An extensible retractable stem device comprising: a strip inherently tensioned when free to curl transversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a shoe member on said carriage spaced from said roller to accommodate therebetween strip from said spool and to support said strip against compressive axial forces in said strip; a strip directing anti-buckling roller on said carriage spaced from said strip engaging roller to accommodate said strip therebetween and located relative to said strip engaging roller to direct said strip substantially radially from said spool; at least one expansible spring loop tensioned about said reeled strip and said rollers to retain said strip on said spool and urge said carriage towards said spool for pressure engagement of said strip engaging roller with said reeled strip; platform means on said carriage extending substantially radially outwardly to define a strip supporting surface in a plane containing the line of contact of said anti-buckling roller with said strip; and means supporting the inward curling of said strip located above said platform and movable with said carriage.

4. An extensible retractable stem device comprising: a strip inherently tensioned when free to curl transversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a shoe member on said carriage spaced from said roller to accommodate therebetween strip from said spool and to support said strip against compressive axial forces in said strip; a strip directing anti-buckling roller on said carriage spaced from said strip engaging roller to accommodate said strip therebetween and located relative to said strip engaging roller to direct said strip substantially radially from said spool; at least one expansible spring loop tensioned about said reeled strip and said rollers to retain said strip on said spool and urge said carriage towards said spool for pressure engagement of said strip engaging roller with said reeled strip; platform means on said carriage extending substantially radially outwardly to define a strip supporting surface in a plane containing the line of contact of said anti-buckling roller with said strip; a pair of substantially cylindrical shaping members each of a diameter substantially less than the effective curl diameter of said tube formable from said strip; and means supporting said shaping members on said carriage in a position slidably retaining said strip between said members and said platform and directing said members for convergent radially outward support of portions of said strip free to curl thereon.

5. An extensible retractable stem device comprising: a strip inherently tensioned when free to curl transversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a strip directing anti-buckling roller on said carriage spaced from said strip engaging roller to accommodate said strip therebetween and located relative to said strip engaging roller to direct said strip substantially radially from said spool; and at least one expansible spring loop tensioned about said reeled strip and said rollers to retain said strip on said spool and urge said carriage towards said spool for pressure engagement of said strip engaging roller with said reeled strip.

6. An extensible retractable stem device comprising: a strip inherently tensioned when free to curl transversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a strip directing anti-buckling roller on said carriage spaced from said strip engaging roller to accommodate said strip therebetween and located relative to said strip engaging roller to direct said strip substantially radially from said spool; at least one expansible spring loop tensioned about said reeled strip and said rollers to retain said strip on said spool and urge said carriage towards said spool for pressure engagement of said strip engaging roller with said reeled strip; platform means on said carriage extending substantially radially outwardly to define a strip supporting surface in a plane containing the line of contact of said anti-buckling roller with said strip; and means supporting the inward curling of said strip located above said platform and movable with said carriage.

7. An extensible retractable stem device comprising: a strip inherently tensioned when free to curl tranversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a strip directing anti-buckling roller on said carriage spaced from said strip engaging roller to accommodate said strip therebetween and located relative to said strip engaging roller to direct said strip substantially radially from said spool; at least one expansible spring loop tensioned about said reeled strip and said rollers to retain said strip on said spool and urge said carriage towards said spool for pressure engagement of said strip engaging roller with said reeled strip; platform means on said carriage extending substantially radially outwardly to define a strip supporting surface in a plane containing the line of contact of said anti-buckling roller with said strip; a pair of substantially cylindrical shaping members each of a diameter substantially less than the effective curl diameter of said tube formable from said strip; and means supporting said shaping members on said carriage in a position slidably retaining said strip between said members and said platform and directing said members for convergent radially outward support of portions of said strip free to curl thereon.

8. An extensible retractable stem device comprising: a strip inherently tensioned when free to curl tranversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a shoe member on said carriage spaced from said roller to accommodate therebetween strip from said spool and to support said strip against compressive axial forces in said strip; a strip directing anti-buckling roller on said carriage spaced from said strip engaging roller to accommodate said strip therebetween and located relative to said strip engaging roller to direct said strip substantially radially from said spool; means urging said carriage toward said spool for pressure engagement of said strip engaging roller with said reeled strip while said spool is stationary and during reeling and unreeling of said strip; and a strip retaining roller on said carriage engageable with said strip on said spool to define with said strip engaging roller to effective points of contact of said carriage with the reeled strip on said spool between which said strip may be projected substantially radially and supportably to form an effectively rigid tube when extended therefrom.

9. An extensible retractable stem device comprising: a strip inherently tensioned when free to curl transversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a shoe member on said carriage spaced from said roller to accommodate therebetween strip from said spool and to support said strip against compressive axial forces in said strip; a strip directing anti-buckling roller on said carriage spaced from said strip engaging roller to accommodate said strip therebetween and located relative to said strip engaging roller to direct said strip substantially radially from said spool; means urging said carriage toward said spool for pressure engagement of said strip engaging roller with said reeled strip while said spool is stationary and during reeling and unreeling of said strip; a strip retaining roller on said carriage engageable with said strip on said spool to define with said strip engaging roller to effective points of contact of said carriage with the reeled strip on said spool between which said strip may be projected substantially radially and supportably to form an effectively rigid tube when extended therefrom; said anti-buckling roller having its centre of rotation located substantially on a tangent to said strip engaging roller at a point thereon intersected by the projecting of a line joining the centres of said spool and said strip engaging roller.

10. An extensible retractable stem device comprising: a strip inherently tensioned when free to curl transversely to form a tube; a spool device upon which said strip may be reeled in flat uncurled form; a frame rotatably supporting said spool device; drive means on said frame connected to said spool device for reeling and unreeling said strip by rotation of said spool; a carriage mounted on said frame and slidable for motion in a direction substantially radially toward and away from said spool; a strip engaging roller on said carriage engageable with the strip on said spool to retain said strip thereon; a strip directing anti-buckling roller on said carriage spaced from said strip engaging roller to accommodate said strip therebetween and located relative to said strip engaging roller to direct said strip substantially radially from said spool; means urging said carriage toward said spool for pressure engagement of said strip engaging roller with said reeled strip while said spool is stationary and during reeling and unreeling of said strip; and means including an electrical limit switch engageable with said strip on said spool adapted to actuate an electrical circuit responsive to a predetermined effective diameter of strip on said spool.

References Cited by the Examiner

UNITED STATES PATENTS

| | | | |
|---|---|---|---|
| 1,563,382 | 12/1925 | Legg | 242—67.3 |
| 1,815,064 | 7/1931 | Legg | 242—67.2 |
| 1,985,802 | 12/1934 | Sheppard | 242—67.2 |
| 2,669,398 | 2/1954 | Olson | 242—55.11 |

FOREIGN PATENTS 235,648  6/1925  Great Britain.

MERVIN STEIN, *Primary Examiner.*

W. S. BURDEN, *Assistant Examiner.*